June 19, 1928.  
A. E. HOHMEISTER  
MIXING VALVE STRUCTURE  
Filed March 2, 1927  
1,674,365
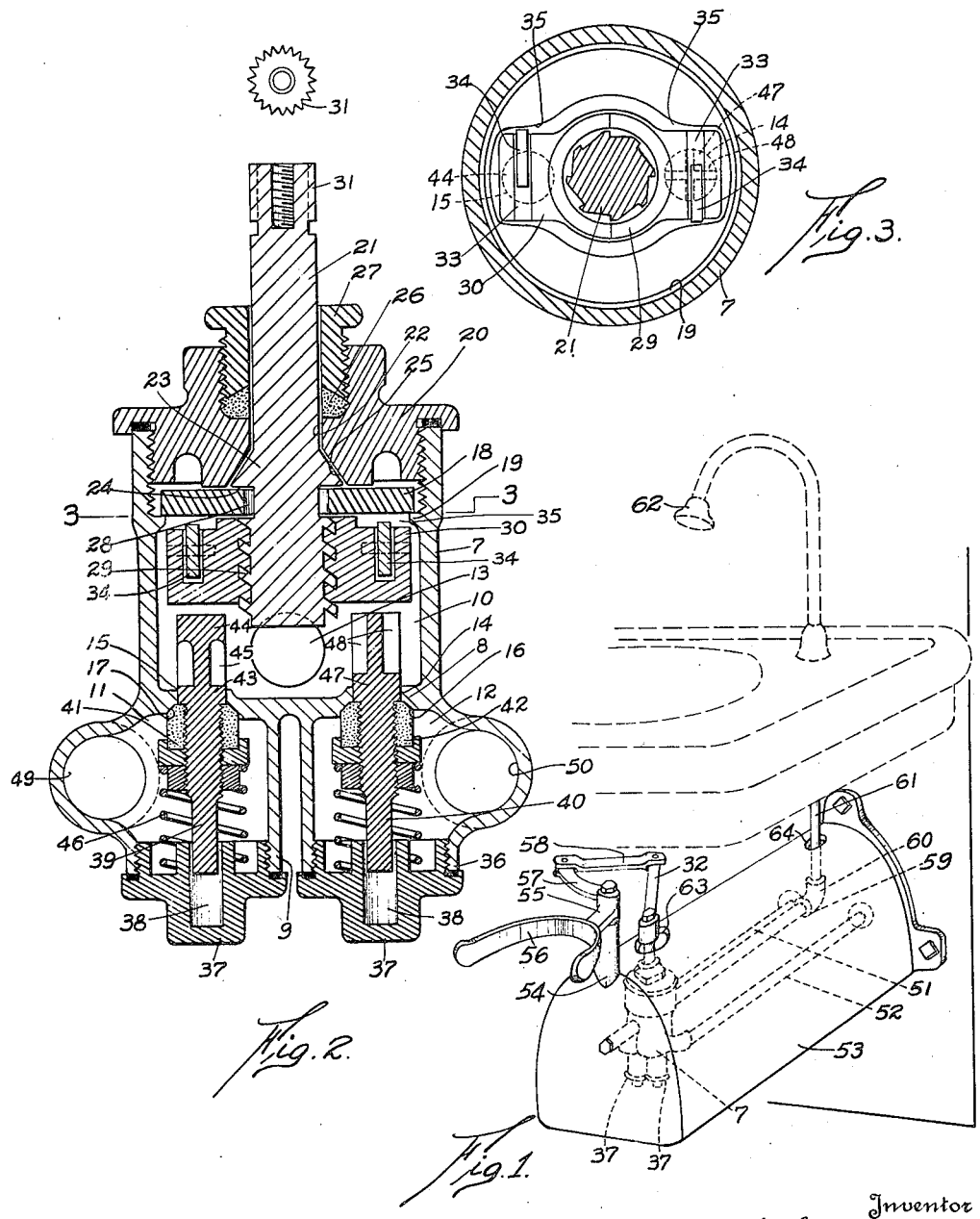

Patented June 19, 1928.

1,674,365

UNITED STATES PATENT OFFICE.

ARTHUR E. HOHMEISTER, OF CINCINNATI, OHIO, ASSIGNOR TO THE JOHN DOUGLAS COMPANY, OF CINCINNATI, OHIO, A CORPORATION OF OHIO.

MIXING-VALVE STRUCTURE.

Application filed March 2, 1927. Serial No. 172,125.

This invention relates to a mixing valve structure and has for its object the provision of a device which is simple of construction and efficient in operation.

Another object is to provide a device of this character which is provided with a simple means for regulating a supply of cold, warm and hot water.

Another object is to provide a device of the class referred to which is compact and which is furthermore easily assembled and dismantled, thereby greatly facilitating replacements of valve washers.

Another object is to provide a compact and neat appearing cover wherein the valve structure and connections of the device may be housed.

Another object is to provide a cover and support, for pipes, valves and operating mechanism, which is independent of a basin or similar fixture thereby providing a simple installation and one which is easily kept clean and sanitary.

These and other objects are attained by the means described herein and disclosed in the accompanying drawings, in which:—

Fig. 1 is a perspective view of the casing and operating levers of the invention and showing the valve structure in dotted lines and associated with a lavatory fixture, also shown in dotted lines.

Fig. 2 is an enlarged vertical cross sectional view of the mixing valve structure of the invention.

Fig. 3 is a cross sectional view taken on line 3—3 of Fig. 2.

In the hereinafter described embodiment and in the drawings the device of the invention is shown associated with a knee action control mechanism and with a cover support. It will be readily understood however that the control mechanism may take any other convenient and approved form, and that the mixing valve is adaptable to use in various ways. The mixing valve comprises a casing 7 provided with diaphragms 8 and 9 to provide a mixing chamber 10, a cold water chamber 11, and a hot water chamber 12 within said casing. A port 13 in casing 7 provides an outlet for the mixing chamber 10. The web 8 has a pair of spaced bores 14 and 15 which provide inlet ports for admitting water from the hot and cold water chambers 12 and 11 into the mixing chamber 10. Tapered annular valve seats 16 and 17 are formed on the lower face of diaphragm 8 surrounding the ports 14 and 15. A thrust plate 18 seats upon an annular internal shoulder 19 on the casing and is adapted to be retained upon its seat by a cap 20 suitably secured to the casing 7 by screw threads or any other suitable means. A valve handle stem 21 extends through a bore 22 in the cap 20 and is provided with a conical flange 23, the flat shoulder 24 of which rests upon the thrust plate 18. The bore 22 is tapered as at 25 complementarily to the flange portion of the valve handle stem 21. From the foregoing, and by reference to Fig. 1 it will be noted that valve handle stem 21 is freely rotatable in the cap 20 and that it is retained against longitudinal movement by the thrust plate 18 and the tapered bore 25 in the cap 20. Suitable packing 26 is received in a threaded socket in the top of cap 20 and is retained therein by a stuffing nut 27. The lower end of the valve handle stem extends through a central opening 28 in the thrust plate 18 and carries a heavy thread 29 which is of very coarse pitch. A yoke 30 is provied with a complementary threaded bore for receiving the threads 29 on the lower end of the valve handle stem. The free outer end 31 of the valve handle stem is longitudinally fluted or grooved for receiving an operating handle or a lever such as 32. The tapered portion 23 seated against the tapered bore 25 in the cap precludes rotation of the stem 21 when pressure is brought to bear upon the yoke 30. From the foregoing it will be seen that by rotating the stem 21 in one direction, the yoke 30 will be projected downwardly because of its threaded engagement with said stem. When the stem is rotated in the opposite direction the yoke will be carried upwardly into abutment with the thrust plate 18. The coarse pitch of threads 29 provides rapid movement of the yoke with but little rotatory movement of the stem. As will be noted in Figs. 2 and 3 the yoke is transversely slotted at each end to provide ways 33 in which rollers 34 are mounted. One of the rollers 34 projects slightly on each longitudinal side of the yoke and bears on the inner wall 35 of the casing 7. That portion of the casing between shoulder 19 and diaphragm 8 is generally elliptical in shape to conform substantially to the shape of the yoke so that the yoke may be freely reciprocated therein without danger of rotatory movement. The bottom end 36 of the casing is closed by means of two cap nuts 37 each of which is provided with a bore 38 wherein valve stems 39 and 40 may reciprocate. The stem 39 is disposed within the cold water chamber 11 and carries a valve 41 which abuts valve seat 17 and thereby controls cold water port 15. A similar structure is employed in the hot water chamber wherein the valve stem 40 carries a valve 42 which abuts seat 16 controlling hot water port 14. The upper end of valve stem 39 extends through port 15 and is provided with a relatively short portion 43 of a diameter sufficient to close the port 15. The stem 39 has at its extreme end another such section 44 which may serve as a plug or closure for the port 15. Intermediate portions 43 and 44 are grooves 45 through which cold water may flow from chamber 11 to chamber 10 when the stem 39 is partially depressed by yoke 30 against the resistance of a spring 46 and the water pressure which normally retain valve 41 upon the seat 17. The free end of valve stem 40 has a plug or closure portion 47 which is of greater length than the plug portion 43 on the cold water valve stem 39. Grooves 48 are cut into the stem 40 beyond the plug portion 47 and extend to the end thereof. The ends of the stems 39 and 40 are normally slightly spaced from the bottom face of the yoke 30 when the latter is in its uppermost position. Inlet ports 49 and 50 for the cold and hot water chambers are normally connected with sources of cold and hot water supply respectively so that there is always a supply of cold water under pressure in the chamber 11 and a supply of hot water under pressure in the chamber 12.

In order to facilitate mounting of the mixing valve and operating means and at the same time to mount them independently of the basin a wall mounted cover housing such as 53 is provided. This cover may be exteriorly finished similarly to the basin so that it is easily cleaned. The basin will require no extra mounting for taps or faucets and is therefore simpler and less expensive to manufacture. The force applied to the operating mechanism will also have no effect on the basin mounting.

In the present embodiment a cover support 53 is adapted to be secured to a supporting surface such as a wall and carries at its forward end an upright 54 upon which is provided a bell crank lever comprising an arm 55 having a U-shaped member or knee stirrup 56 and a second arm 57 which is connected to valve operating lever 32 by a pivotally mounted link 58. The discharge port 13 of valve casing 7 has connected thereto a pipe 59 and a suitable elbow connection or union 60 for receiving the pipe 61 which connects with any suitable nozzle such as 62. The cover support 53 has perforations 63 and 64 through which the stem 21 and pipe 61 extend.

The operation of the device is as follows. The installation, as will be readily apparent from Fig. 1 of the drawings, comprises securing the cover 53 to a wall or other supporting surface beneath the basin or other fixture with which it is to be associated, and then connecting cold and hot water supply pipes 51 and 52 with ports 49 and 50 of the mixing valve structure. The valve handle stem 21 is then projected through opening 63 in the cover and the bell crank lever and lever 32 are mounted in position and connected by link 58. Pipe 59 is then connected with port 13 in the mixing chamber and pipe 61 connected thereto and to the nozzle fixture such as 62. The device is then ready for use. When it is desired to secure a supply of cold water from the nozzle 62 lever 32 is actuated by means of the knee stirrup 56 and its bell crank lever and thereby imparts rotatory movement to the stem 21. This results in downward movement of the yoke 30 due to the threaded relation of said yoke and the stem 21. As the yoke 30 moves downwardly it abuts the ends of valve stems 39 and 40, depressing them against the resistance of springs 46 and the water pressure in chambers 11 and 12. At this time the valves 41 and 42 begin to unseat, but water does not flow through the ports 14 and 15 because of the plug portions 43 and 47 on stems 39 and 40. A further movement of the stem 21 serves to project the yoke downwardly so that the stems are further depressed. At this time the plug portion 43 has been entirely removed from port 15 of the cold water chamber so that cold water may pass through the grooves 45 in the stem 39 and into the mixing chamber 10. The plug portion 47 on the valve stem 40 however, being of greater length than plug portion 43 prevents a flow of water from hot water chamber 12 to the mixing chamber 10. Further depression of the stems 39 and 40, through the agency of the stem and yoke, now moves the plug portion 47 clear of port 14 while plug portion 43 recedes further into chamber 11. At this time hot water flows from chamber 12 through port 14 into the mixing chamber and mixes with the cold water which continues to flow through port 15. This provides a supply of warm water which flows through port 13, pipes 59 and 61 and through nozzle 62. When it is desired to secure a supply of hot water, the yoke is further depressed through the agency of the stem until the plug portion 44 on cold water valve stem 39 enters port 15 thereby closing it. At this time the valve stem 40 is depressed for a like distance and the hot water alone flows through port 14 into the mixing chamber.

This regulation and control of the water supply is conveniently effected by an operator who may insert his knee into the stirrup 56 and move it to the left or right to secure the desired supply of water at the proper temperature. It will be understood however that any other suitable type of control handle or lever may be employed for securing manual or pedal control.

What is claimed is:

1. In a device of the class described the combination of a casing having substantially circular end openings and a reduced substantially elliptical intermediate opening, a yoke mounted for reciprocation in said intermediate opening, rollers on the sides of said yoke adapted to ride over the walls of said intermediate portion of the casing, the yoke having a threaded bore therein, a threaded stem in said bore for rotatable movement to reciprocate the yoke in the casing and a valve stem in the casing adapted to be depressed upon movement of the yoke by the stem.

2. In a device of the class described the combination of a cover member, a mixing valve disposed beneath said cover and having an actuating stem projecting through said cover, an actuating lever mounted on the stem, a bell crank lever pivotally mounted on the cover and a link connecting the bell crank lever and the actuating lever for operating the mixing valve.

3. In a sanitary plumbing fixture the combination of an unitary inverted cover adapted for wall mounting, a valve within said cover and having an actuating stem extending through the cover, a supply pipe within the cover and connected to the valve, and an actuating means for the valve stem mounted on the exterior of the cover.

4. In a device of the class described the combination of an unitary inverted cover, means on the cover for mounting it upon a surface, said cover having an opening for receiving supply pipes, a valve within the cover, a valve stem extending through the cover and means for actuating the valve stem mounted on the cover.

5. As a new article of manufacture an integral cover member having an open bottom and rear end and having means for securing it with its open rear end against a wall for closing the rear end, said cover being adapted to receive and house a supply pipe and control valve and adapted to serve as a mounting support for exteriorly operable means for actuating a valve within the cover.

In testimony whereof, I have hereunto subscribed my name this 21st day of February, 1927.

ARTHUR E. HOHMEISTER.